June 10, 1947.　　　　E. H. HAUG　　　　2,421,786
CIRCUIT CONTROL APPARATUS
Filed July 28, 1944
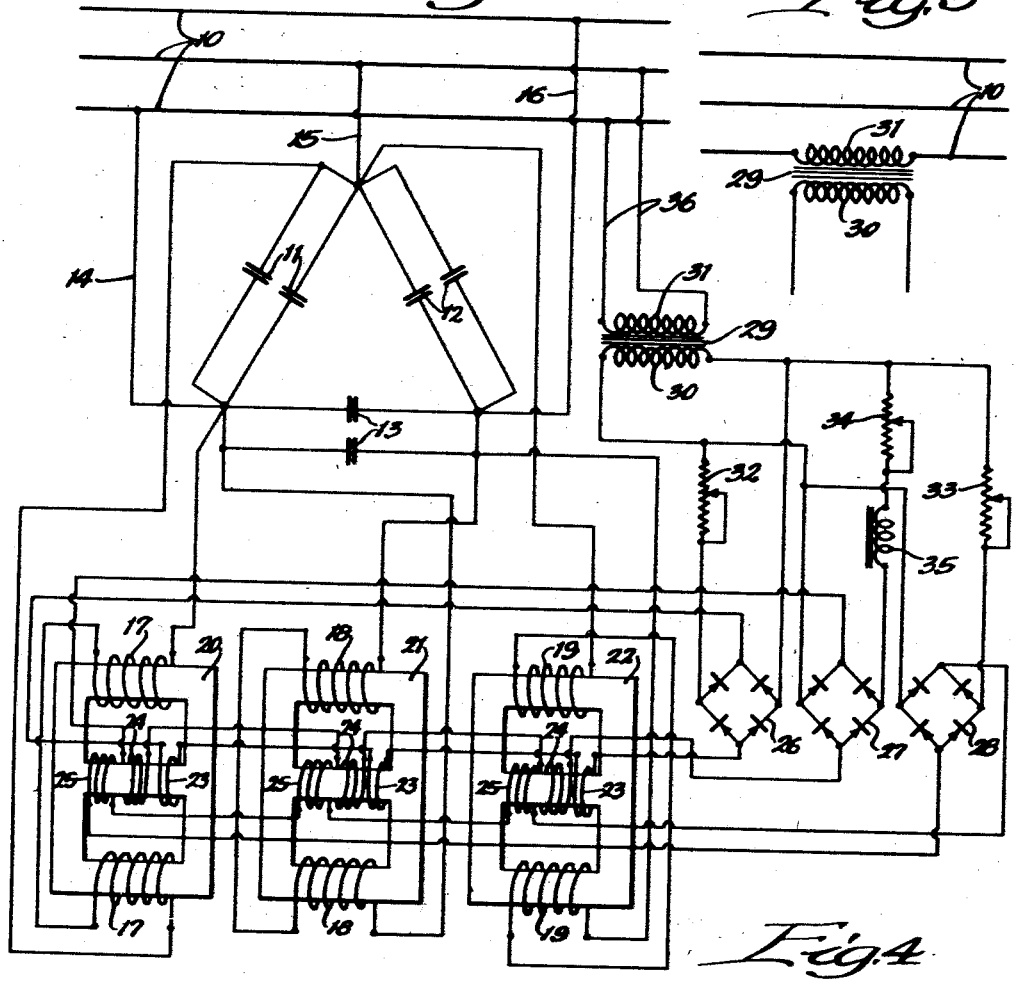
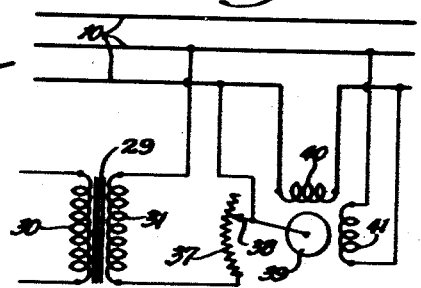
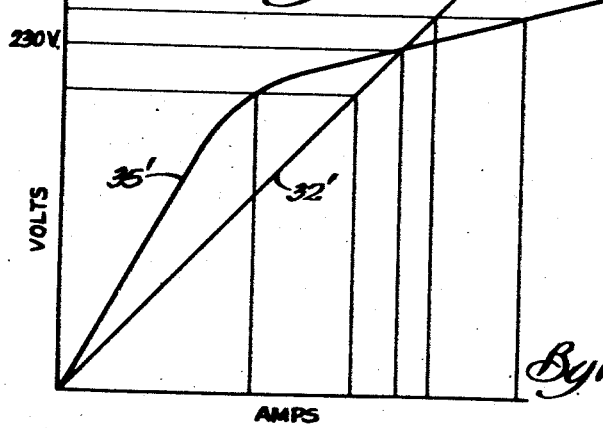
Inventor:
Eugene H. Haug,
By Dawson, Ooms & Conti,
Attorneys.

Patented June 10, 1947

2,421,786

UNITED STATES PATENT OFFICE 2,421,786

CIRCUIT CONTROL APPARATUS

Eugene H. Haug, Glencoe, Ill., assignor to La Salle National Bank, Chicago, Ill., as trustee Application July 28, 1944, Serial No. 547,053

12 Claims. (Cl. 172—246)

1

This invention relates to circuit control apparatus and more particularly to apparatus to control the power factor in an alternating current circuit.

One of the objects of the invention is to provide circuit control apparatus in which the amount of power factor correction introduced into the circuit is varied in accordance with a condition of the circuit such as voltage, current or power factor.

Another object is to provide circuit control apparatus in which a condenser and reactor are connected across the circuit to introduce a leading current the amount of which is varied by varying the effective inductance of the reactor.

Still another object is to provide circuit control apparatus in which a condenser and inductance coil are connected across the circuit and the effect is varied by varying the saturation of the core on which the coil is wound.

A further object is to provide circuit control apparatus in which the core of an inductance coil connected across the circuit in conjunction with a condenser is variably saturated by opposed windings whose currents vary at different rates in response to voltage changes.

The above and other objects and advantages of the invention will be more readily apparent from the following description when read in connection with the accompanying drawings, in which—

Figure 1 is a circuit diagram of one form of apparatus embodying the invention;

Figure 2 is a graph showing operating curves of parts of the apparatus; and

Figures 3 and 4 are partial circuit diagrams of alternative circuit arrangements.

As shown in Figure 1, the apparatus is adapted to control the voltage and power factor in a three phase three wire circuit indicated at 10. The apparatus comprises three sets of condensers 11, 12 and 13 connected in delta with the terminals of the delta circuit connected thru wires 14, 15 and 16 respectively to the three wires of the circuit 10.

Reactors are connected in parallel with the several sets of condensers and as shown, comprise split coils 17, 18 and 19 wound on cores 20, 21 and 22 respectively. As shown, each of the cores has three interconnected legs with the separate sections of the coils wound on the outer legs and connected in series.

In order to control the effective inductance of the coils the cores are variably saturated by means of saturating windings on the center leg of each core. The windings as shown comprise base windings 23 interconnected in series with one base winding section on the center leg of each core. Three buck windings 24 are mounted on the center legs of the cores respectively and are so wound

2 and connected as to oppose or buck the flux produced by the base windings. Boost windings 25 are mounted on the center legs of the cores and are so wound and connected as to boost the windings 23. With this arrangement the base windings provide a minimum or base saturation for the cores and the effective saturation is controlled by varying the current thru the buck and boost windings to vary the effective inductance of the coils.

The several saturating windings are supplied with direct current thru rectifiers 26, 27 and 28 respectively which are supplied with alternating current from a transformer 29 having a secondary 30 and a primary 31. The transformer secondary 30 is connected to the several rectifiers in parallel with an adjustable resistor 32 in series with the rectifier 26, a similar adjustable resistor 33 in series with the rectifier 28, and an adjustable resistor 34 and an inductance coil 35 in series with the rectifier 27.

The characteristic operating curves of the resistor 32 and inductance coil 35 are indicated in Figure 2 in which the curve 32' indicates the variation of current with voltage thru the resistor 32 and the curve 35' indicates the variation of current with voltage thru the coil 35. From these curves it will be seen that at one particular voltage value at which the curves intersect, the currents will be equal while for an increase or decrease in voltage they become unequal.

The circuit arrangement disclosed in Figure 1 is adapted to operate in response to voltage changes in the circuit 10 to maintain the voltage substantially constant and to keep the power factor at a value near unity. For this purpose the transformer primary 31 is connected thru windings 36 across one phase of the supply circuit so that the transformer output will vary in accordance with voltage variations in the circuit. In use the resistors 32, 33, and 34 are so adjusted that the curves 32' and 35' will intersect at the desired voltage value. With the circuit in this condition the effective inductance of the coils 17, 18 and 19 is such as to introduce the desired power factor correction into the circuit and to maintain the desired voltage drop across the several phases of the circuit. Upon an increase in voltage in the circuit the output voltage of the transformer 29 will increase to increase the current in the buck coils 24 over that in the boost coils 25 as will be seen from the curves in Figure 2. This will decrease the effective saturation of the inductance cores and will increase the effective inductance. Similarly upon a decrease in voltage the current in the boost coils will become relatively greater than that in the buck coils to increase the effective saturation of the cores. Thus the amount of power factor correction will be automatically varied in accordance with voltage changes in the circuit and the effective impedance across the circuit will simultaneously be varied to maintain the voltage substantially constant.

Instead of controlling the circuit in response to voltage as shown in Figure 1, it could equally well be controlled in response to current as indicated in Figure 3 to vary the power factor correction in accordance with current changes. For this purpose the primary winding 31 of the transformer 29 is connected in series in one of the wires in the circuit 10 as shown in Figure 3. As long as the current is at the desired value the currents in the buck and boost coils will be equal and any variation in current in the power circuit will cause an unbalance of the buck and boost currents to vary the effective saturation of the core. In this arrangement the power factor correction introduced into the circuit will vary in accordance with current to maintain the power factor at a high value.

Still another arrangement is indicated in Figure 4 in which the power factor is controlled in accordance with changes in the power factor itself. In this arrangement the primary winding 31 of the transformer 29 is connected across one phase of the supply circuit and has in series therewith a rheostat 37. The rheostat has an adjustable wiper 38 controlled by a rotatable armature 39 which rotates in the field of two coils 40 and 41 arranged at right angles to each other in the manner of the usual power factor meter. The coil 40 is connected in series in one wire of the supply circuit 10 and the coil 41 is connected across one phase of the supply circuit so that the armature 39 will be adjusted in accordance with the phase position of the current and voltage in the supply circuit. With this arrangement the power factor correction introduced into the supply circuit will be varied automatically in accordance with power factor variations to maintain the power factor at a high value.

While several embodiments of the invention have been shown and described in detail herein, it will be understood that these are illustrative only and are not intended as definition of the scope of the invention, reference being had for this purpose to the appended claims.

What is claimed is:

1. Circuit control apparatus for a three phase three wire alternating current circuit comprising three capacitors connected in delta with the terminals of the delta connected to the three wires of the circuit respectively, inductance coils connected in parallel with the capacitors, cores for the inductance coils, each of the cores having three interconnected legs and each of the coils including two windings in series on two of the legs of a core, three saturating windings on the third leg of each of the cores, the first of said saturating windings having a fixed polarity, the second of said saturating windings having an additive polarity relation to the first of said saturating windings, while the third of said saturating windings has a subtractive polarity relation to the first of said saturating windings, separate rectifiers connected to the saturating windings, separate connections from the rectifiers to a source of alternating current, a resistor in circuit with one of said rectifiers, and a reactor in circuit with another of said rectifiers.

2. Circuit control apparatus for an alternating current circuit comprising a condenser and an inductance coil connected in parallel across the circuit, a core for the coil, three saturating windings on the core, the first of said saturating windings having a fixed polarity, the second of said saturating windings having an additive polarity relation to the first of said saturating windings, while the third of said saturating windings has a subtractive polarity relation to the first of said saturating windings, a rectifier supplying the saturating windings, a transformer having a primary and a secondary connected to the rectifier, and connections from the transformer primary across the circuit to make the saturating current responsive to the circuit voltage.

3. Circuit control apparatus for an alternating current circuit comprising a condenser and an inductance coil connected in parallel across the circuit, a core for the coil, three saturating windings on the core, the first of said saturating windings having a fixed polarity, the second of said saturating windings having an additive polarity relation to the first of said saturating windings, while the third of said saturating windings has a subtractive polarity relation to the first of said saturating windings, a rectifier supplying the saturating windings, a transformer having a primary and a secondary connected to the rectifier, and the transformer primary being connected in series in the circuit to make the saturating current responsive to the circuit current.

4. Circuit control apparatus for an alternating current circuit comprising a condenser and an inductance coil connected in parallel across the circuit, a core for the coil, three saturating windings on the core, the first of said saturating windings having a fixed polarity, the second of said saturating windings having an additive polarity relation to the first of said saturating windings, while the third of said saturating windings has a subtractive polarity relation to the first of said saturating windings, means to supply direct current to the saturating windings, and means responsive to both current and voltage in the circuit to control the last named means to vary the saturating current in accordance with variations in power factor in the circuit.

5. Circuit control apparatus for an alternating current circuit comprising a condenser and an inductance coil connected in parallel across the circuit, a core for the coil, three saturating windings on the core, the first of said saturating windings having a fixed polarity, the second of said saturating windings having an additive polarity relation to the first of said saturating windings, while the third of said saturating windings has a subtractive polarity relation to the first of said saturating windings, separate rectifiers for the saturating windings, a transformer having its secondary connected to the rectifiers to supply them, a resistor in circuit with one of said rectifiers, a reactor in circuit with another of said rectifiers, and the transformer primary being connected across the circuit to be responsive to the voltage therein.

6. Circuit control apparatus for an alternating current circuit comprising a condenser and an inductance coil connected in parallel across the circuit, a core for the coil, three saturating windings on the core, the first of said saturating windings having a fixed polarity, the second of said saturating windings having an additive polarity relation to the first of said saturating windings, while the third of said saturating windings has a subtractive polarity relation to the first of said saturating windings, separate rectifiers for the saturating windings, a transformer having its secondary connected to the rectifiers to supply them, a resistor in circuit with one of said rectifiers, a reactor in circuit with another of said rectifiers, and the transformer primary being connected in series in the circuit to be responsive to the current therein.

7. Circuit control apparatus for an alternating current circuit comprising a condenser and an inductance coil connected in parallel across the circuit, a core for the coil, three saturating windings on the core, the first of said saturating windings having a fixed polarity, the second of said saturating windings having an additive polarity relation to the first of said saturating windings, while the third of said saturating windings has a subtractive polarity relation to the first of said saturating windings, separate rectifiers for the saturating windings, a transformer having its secondary connected to the rectifiers to supply them, a resistor in circuit with one of said rectifiers, a reactor in circuit with another of said rectifiers, means to vary the transformer current, and control means responsive to both the voltage and current in the circuit to control the last named means in accordance with the power factor in the circuit.

8. Circuit control apparatus for an alternating current circuit comprising a condenser and an inductance coil connected in parallel across the circuit, a core for the coil, three saturating windings on the core, the first of said saturating windings having a fixed polarity, the second of said saturating windings having an additive polarity relation to the first of said saturating windings, while the third of said saturating windings has a subtractive polarity relation to the first of said saturating windings, separate rectifiers for the saturating windings, a transformer having its secondary connected to the rectifiers to supply them, a resistor in circuit with one of said rectifiers, a reactor in circuit with another of said rectifiers, a rheostat in series with the transformer primary, a rotatable armature to adjust the rheostat, and two coils at 90° controlling the armature, one of the coils being connected in series in the circuit and the other being connected across the circuit.

9. In a power factor controlling apparatus for an alternating current circuit comprising a condenser and an inductance coil connected in parallel across the circuit, a core for the coil, a power factor sensitive device for measuring the power factor and controlling the saturation of the reactor, said power factor sensitive device consisting of a saturating reactor with three saturating windings on a core, the first of said saturating windings having a fixed polarity, the second of said saturating windings having an additive polarity relation to the first of said saturating windings, while the third of said saturating windings has a subtractive polarity relation to the first of said saturating windings, separate rectifiers for said saturating windings, a transformer having its secondary connected to the rectifiers to supply them, a resistor in circuit with one of said rectifiers, a reactor in circuit with another of said rectifiers, and the transformer primary being connected across the circuit to be responsive to the power factor therein.

10. In a power factor controlling apparatus for an alternating current circuit comprising a condenser and an inductance coil connected in parallel across the circuit, a core for the coil, a power factor sensitive device for measuring the power factor and controlling the saturation of the reactor, said power factor sensitive device consisting of a saturating reactor with three saturating windings on a core, the first of said saturating windings having a fixed polarity, the second of said saturating windings having an additive polarity relation to the first of said saturating windings, while the third of said saturating windings has a subtractive polarity relation to the first of said saturating windings, separate rectifiers for said saturating windings, a transformer having its secondary connected to the rectifiers to supply them, a resistor in circuit with one of said rectifiers, a reactor in circuit with another of said rectifiers, and the transformer primary being connected in series in the circuit to be responsive to the current therein.

11. A voltage control apparatus for an alternating current circuit comprising a condenser and an inductance coil connected in parallel across the circuit, a core for the coil, a voltage sensitive device for measuring the voltage and controlling the saturation of the reactor, said voltage sensitive and controlling device consisting of a saturating reactor with three saturating windings on a core, the first of said saturating windings having a fixed polarity, the second of said saturating windings having an additive polarity relation to the first of said saturating windings, while the third of said saturating windings has a subtractive polarity relation to the first of said saturating windings, separate rectifiers for said saturating windings, a transformer having its secondary connected to the rectifiers to supply them, a resistor in circuit with one of said rectifiers, a reactor in circuit with another of said rectifiers, and the transformer primary being connected across the circuit to be responsive to the voltage therein.

12. A voltage control apparatus for an alternating current circuit comprising a condenser and an inductance coil connected in parallel across the circuit, a core for the coil, a voltage sensitive device for measuring the voltage and controlling the saturation of the reactor, said voltage sensitive and controlling device consisting of a saturating reactor with three saturating windings on a core, the first of said saturating windings having a fixed polarity, the second of said saturating windings having an additive polarity relation to the first of said saturating windings, while the third of said saturating windings has a subtractive polarity relation to the first of said saturating windings, separate rectifiers for said saturating windings, a transformer having its secondary connected to the rectifiers to supply them, a resistor in circuit with one of said rectifiers, a reactor in circuit with another of said rectifiers, and the transformer primary being connected in series in the circuit to be responsive to the voltage therein.

EUGENE H. HAUG.

REFERENCES CITED

The following references are of record in the file of this patent:

UNITED STATES PATENTS

| Number | Name | Date |
| --- | --- | --- |
| 2,040,684 | Boyajian | May 12, 1936 |
| 2,066,919 | West | Jan. 5, 1947 |

FOREIGN PATENTS

| Number | Country | Date |
| --- | --- | --- |
| 594,015 | France | June 8, 1947 |